(12) United States Patent
Christensen et al.

(10) Patent No.: US 7,913,480 B2
(45) Date of Patent: Mar. 29, 2011

(54) ROW UNIT FOR AN AGRICULTURAL HARVESTER

(75) Inventors: Timothy Franklin Christensen, Moline, IL (US); Kent Stephen Brown, Lynn Center, IL (US)

(73) Assignee: Deere & Company, Moline, IL (US)

( * ) Notice: Subject to any disclaimer, the term of this patent is extended or adjusted under 35 U.S.C. 154(b) by 50 days.

(21) Appl. No.: 12/546,313

(22) Filed: Aug. 24, 2009

(65) Prior Publication Data
US 2010/0071337 A1    Mar. 25, 2010

Related U.S. Application Data

(60) Provisional application No. 61/099,562, filed on Sep. 23, 2008.

(51) Int. Cl.
*A01D 45/02* (2006.01)

(52) U.S. Cl. .............................................. 56/62; 56/119
(58) Field of Classification Search ............... 56/51–121
See application file for complete search history.

(56) References Cited

U.S. PATENT DOCUMENTS

| | | | | |
|---|---|---|---|---|
| 5,881,541 | A | * | 3/1999 | Silver et al. ...................... 56/98 |
| 6,226,969 | B1 | | 5/2001 | Becker |
| 6,237,312 | B1 | * | 5/2001 | Becker ............................. 56/62 |
| 2007/0193242 | A1 | | 8/2007 | Kost et al. |

OTHER PUBLICATIONS

European Search Report dated Mar. 23, 2010 (5 pages).

* cited by examiner

*Primary Examiner* — Alicia M Torres

(57) ABSTRACT

A row unit for an agricultural harvester includes left and right row unit arms that are fixed together with the shaped support. The shaped support is bent to extend across the top of the row unit arms and down the outside vertical surfaces of the row unit arms. The shaped support is welded to the outside vertical surfaces of the row unit arms.

10 Claims, 8 Drawing Sheets

US 7,913,480 B2

ROW UNIT FOR AN AGRICULTURAL HARVESTER

RELATED APPLICATIONS

This application claims priority from, application No. 61/099,562, filed on Sep. 23, 2008, which is incorporated herein in its entirety for all that it teaches.

FIELD OF THE INVENTION

The present invention relates to improvements to a grain head for a harvesting machine.

BACKGROUND OF THE INVENTION

Harvesting heads for agricultural harvesters that are configured to harvest row crops typically have devices called row units. Row units are the mechanical assemblies that are configured to receive a row of crop plants, and to harvest them. Row units, such as cornrow units, also include structures to strip away part of the unwanted crop material, such as the plant's stalk.

In its simplest configuration, a cornrow unit, such as the one illustrated herein, includes 2 elongate cantilevered arms that extend forwardly and generally horizontally in the direction of travel. These arms, fixed together at the rear of the arms, define a gap there between that is configured to receive a single row of crop plants. The arms support gathering chains, endless chains on each arm that gather the crop plants that are directed into the gap between the arms and pull them rearward.

Stalk rolls (also known as snapping rolls) are provided underneath the row unit arms to grasp the plant's talk as it is pulled rearward by the gathering chains and to pull the stalk downward. And deck plates which are disposed on the upper surfaces of the arms define an adjustable gap that permits the plant stalks to be pulled downward and ejected into the ground but will not permit ears of corn to pass there between and be lost. Instead, the ears of corn are "snapped" from the plant stalk and are carried rearward by the gathering chains into the agricultural harvester.

A gearbox is bolted to the rear of the row unit arms—typically between them—to drive the gathering chains and the stalk rolls. The gearbox or the ends of the row unit arms are bolted to a laterally extending bar in the harvesting head that supports the row units.

Row units travel through the field quite close to the ground in order not to miss any portion of the crop. There are problems, however, with this arrangement. As the harvesting head of the agricultural harvester traverses the ground, the tips of the row units may drop low enough to skid along the surface of the ground or (worse) dig into the ground. When this happens, the row unit arms, which are camped levered forward from the frame of the harvesting head are prone to bend or break. It is a continuing concern of agricultural engineers to make row units as light as possible to reduce power consumption and wait, but not so light that they are damaged.

The present application is directed to the problem of providing row units with row unit arm assemblies that are both light and strong.

SUMMARY OF THE INVENTION

In accordance with one aspect of the invention, a harvester row unit is provided having a first row unit arm having a top surface that is generally horizontal and an outer surface that is generally vertical; a second row unit arm having a top surface that is generally horizontal and an outer surface that is generally vertical; and a shaped support having a top surface that is welded to the top surfaces of the first and second row unit arms, having first and second side surfaces that are welded to the outer surfaces of the first and second row unit arms, wherein the first and second side surfaces are welded to the outer surfaces of the first and second row unit arms at apertures in the first and second side surfaces.

Each of the first and second row unit arms may be bent to provide a crease along an edge defining the intersection of the top surface and outer surface of the first and second row unit arms. Each of the first and second row unit arms may have a box beam construction, with a first L-shaped sheet of metal comprising the top and outer surfaces of the first and second row unit arms, and a second L-shaped sheet of metal defining bottom and inner surfaces of the first and second row unit arms, and further wherein the first and second L-shaped sheet of metal are welded together to form a box beam from the top, outer, inner, and bottom surfaces. The second L-shaped sheet of metal of each of the first and second row unit arms may have at least one row of apertures abutting the first L-shaped sheet of metal, and the apertures may extend along the length of the second L-shaped sheet of metal, and further wherein edges of the apertures are welded to the first L-shaped sheet of metal to form the box beam. The apertures in the first and second side surfaces may be formed by cutting and bending a tab upward from the side surfaces. The tab may be configured to support a hinge. The first and second side surfaces of the shaped support a further include forwardly extending portions that extend forward from the top surface of the side support. The forwardly extending portions maybe welded to the first and second row unit arms. The shaped support may wrap around and the welded to the top and sides of the first and second row unit arms to provide at least a double layer construction of sheet metal. A portion of the first and second side surfaces may laminate a row unit gearbox mount to provide additional mount thickness.

DETAILED DESCRIPTION OF THE PREFERRED EMBODIMENT

Figure 1:
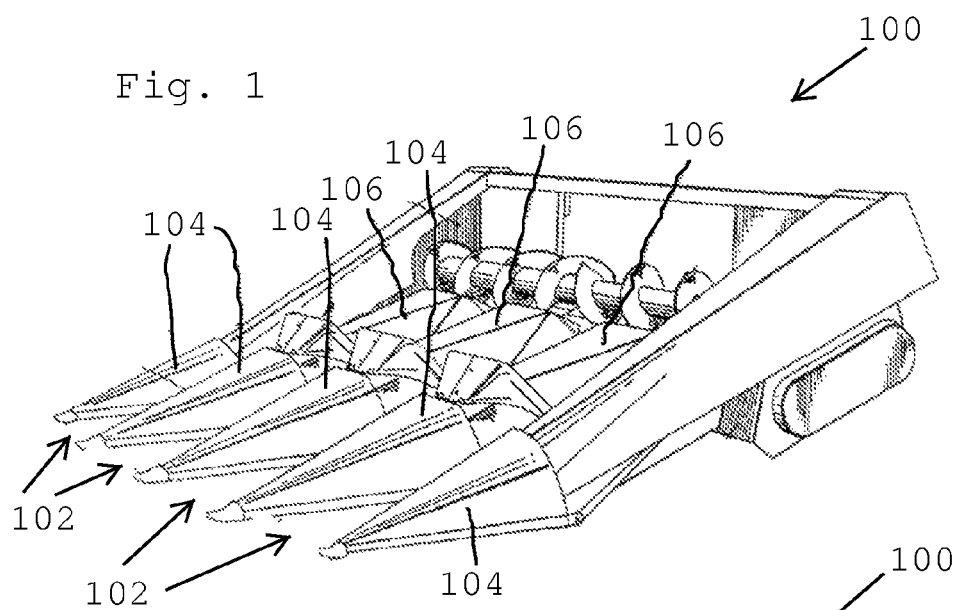
FIG. 1 is a perspective view of a corn head having row units accordance with the present invention.
Figure 2:
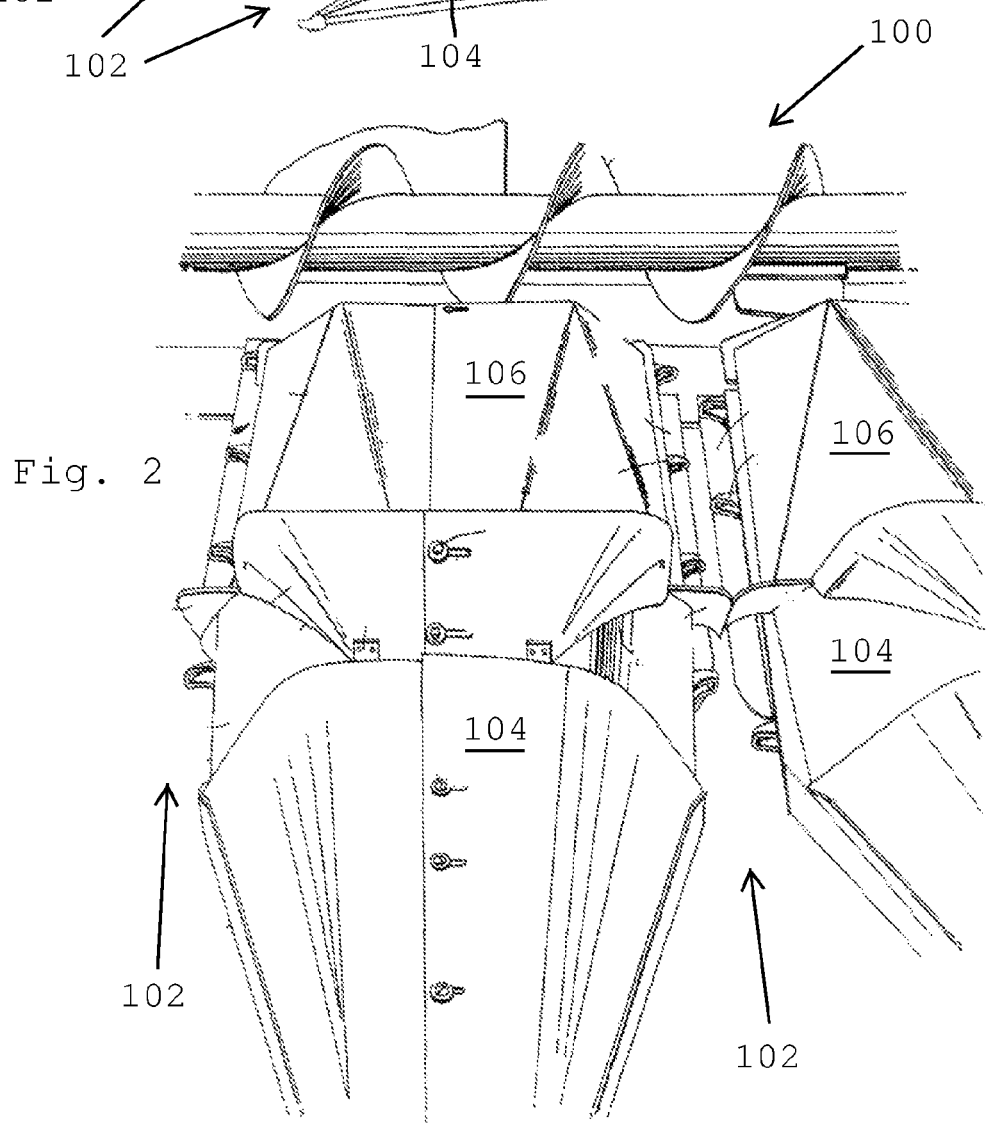
FIG. 2 is an elevated front view of the corn head of FIG. 1.

In FIGS. 1-2 there is illustrated a row crop head 100 having four row units 102 for the harvesting of crops, particularly corn. Points 104 and covers 106 (herein individually and collectively called "covers") are disposed to rest on support brackets mounted on the front ends of the arms of each row unit and to cover portions of adjacent row units. The covers cover almost all of the row units 102 leaving only the gathering chains and deck plates exposed to receive the stalks of row crop plants. The corn head 100 is supported on a combine (not shown) which carries it through the field. The covers 106 are hinged at their rear ends to a hinge assembly that is mounted to two adjacent row units 102.

Figure 3:
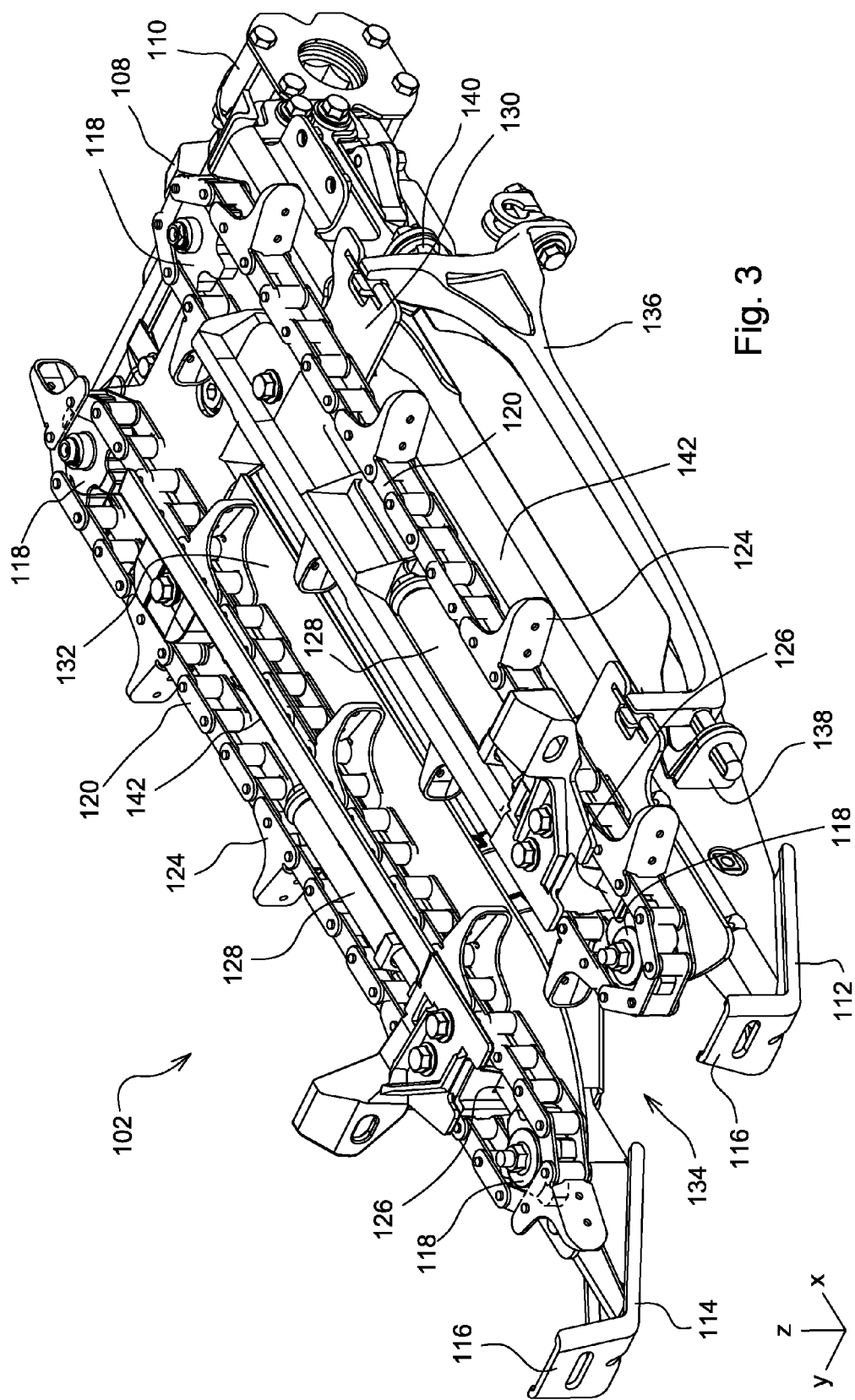
FIG. 3 is a perspective view of a row unit of FIGS. 1-2.
Figure 4:
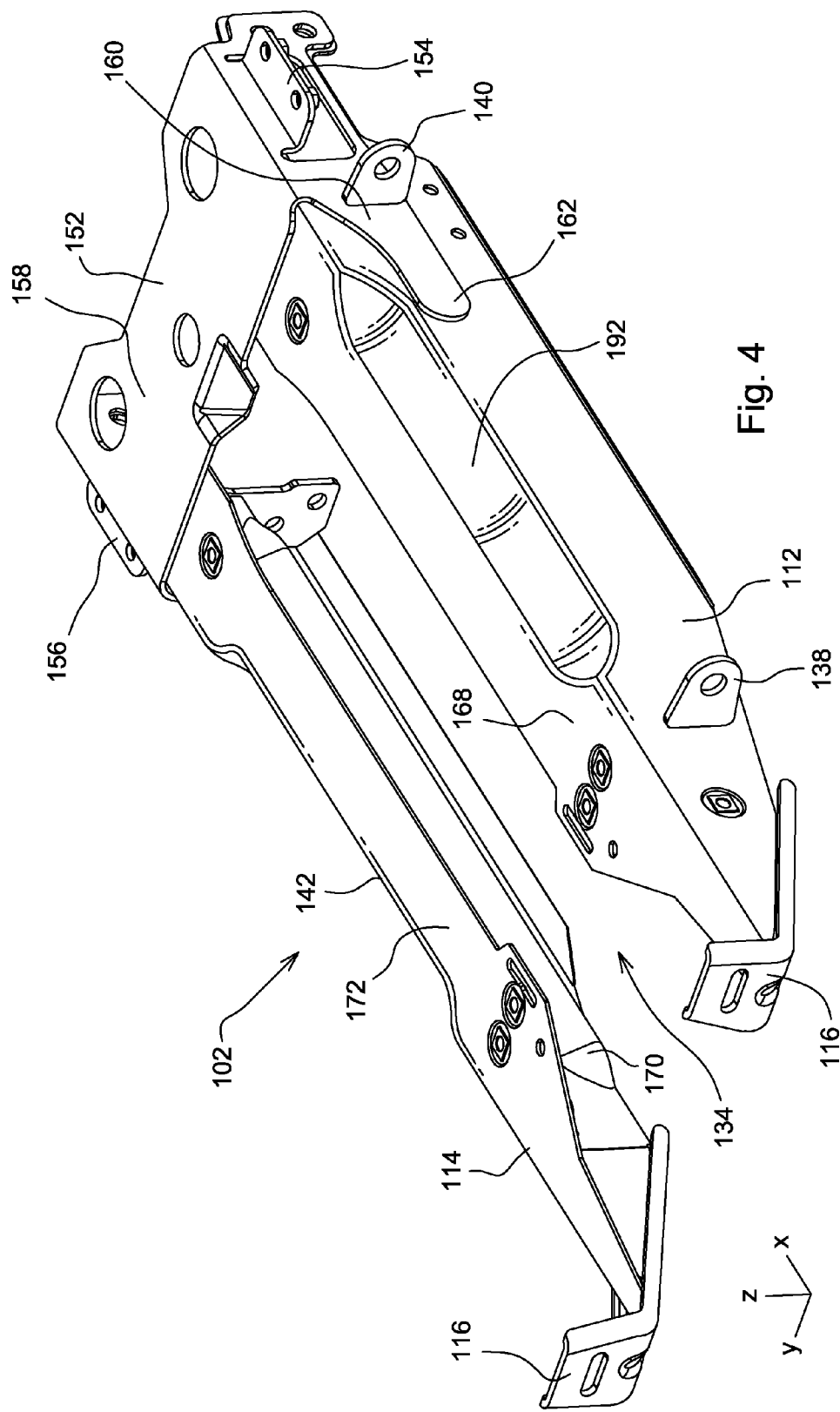
FIG. 4 is a perspective view of the row unit arm assembly of FIG. 3.

Referring now to FIG. 3, each row unit 102 includes a gearbox 108 and a clutch 110 attached to the rear portions of row unit arms 112, 114. Gearbox 108 and clutch 110 receive power from a row unit drive shaft, not shown, and then distribute the power in order to drive the various elements of row unit 102. Row unit arms 112 and 114 are substantially similar and may be a mirror image of each other (as illustrated herein), being position to support elements of row unit 102. A shoe 116 is attached to afford portion of each row unit arm 112, 114 to protect the distal ends of row unit arms 112 and 114 from impact.

Proximate to each end of row unit arms 112, 114 (and supported thereon) there is rotatingly connected a sprocket 118, each sprocket having 6 teeth to advantageously allow for a narrower construction of each row unit 102. The rear sprocket 118 in each arm 112, 114 at extends from the gearbox 108 and is driven in rotation by the gearbox 108. The front sprocket 118 of each arm 112, 116 located forwardly and away from the gearbox 108 and is driven by a gathering chain 120. Each gathering chain is driven by the rear sprocket 118, and in turn drives the front sprocket 118.

Gathering chains 120 are assemblies of individual chain links that includes straight links 122 and pusher links 124. The gathering chains 120 are disposed to engage into a gap between the two row unit arms 112, 114. Gathering chains 120 each have 8 pusher links 124 which may be mounted as shown or in an opposite sense to that which is illustrated. There are 6 straight links 122 between each pusher link 124 so that one rotation of sprocket 118 (which has 6 teeth) makes one full revolution relative to the links of each chain assembly until it encounters another pusher link 124 at the same relative position to sprocket 118.

The two forward sprockets 118 are supported on spring-loaded bars 126 that are tensioned by springs 128. Springs 128 apply a force to the sprocket shafts that support the two forward sprockets 118 for rotation. Springs 128 and spring-loaded bars 126 apply a force on the sprocket shafts tending to push forward sprockets 118 forward and away from the two rear sprockets 118. This spreading apart of the front and rear sprockets maintains the proper tension in gathering chains 120.

Left and right deck plates 130, 132 are mounted on the top planar surface of row unit arms 112, 114, respectively for sliding movement toward and away from the gap 134 between row unit arms 112, 114. A deck plate actuator 136 is supported for pivotal movement on actuator mounts 138, 140 which are fixed to and extend from row unit arms 112, 114. Deck plate actuator 136 is coupled to deck plate 130 to slide deck plate 130 into gap 134 when deck plate actuator 136 is pivoted in deck plate actuator mounts 138, 140.

As row crop plants are drawn in to gap 134 by gathering chains 120, grain and other material often separates from the plant stalks and cobs and falls down on the planar upper surfaces of the row unit arms 112, 114. This plant matter can be trapped in recesses on the surface of the row unit arms making it difficult to remove. For this reason, among others, elongate indentations or creases 142 are formed on the top surfaces of row unit arms 112, 114.

These indentations are preferably angled at 35-65° (more preferably 45°) with respect to vertical or with respect to the upper surface of row unit arms 112, 114 to permit plant matter falling on the upper surface of the row unit arms 112, 114 to fall off the row unit arms and on to the ground.

These indentations 142 are positioned underneath the gathering chain as it makes its return path from the rear sprocket 118 to the front sprocket 118 of each row unit arm. This indentation thereby permits seed falling on the row unit chain to call completely through and underneath the row unit chain and on to the ground instead of being drawn by the row unit chain into a jamming relationship between front sprocket 118 and row unit chain 120.

By forming indentations 142, an elongate section of the row unit arms is work hardened, first at an elongate upper bend line 182, second at an elongate lower bend line 184 and third at an elongate concave radiused portion 186 disposed between bend lines 182 and 184. These three structures of each indentation 142 extend parallel to the longitudinal extent of the row unit arms. These work hardened structures increases the ability of the row unit arms to resist damage.

Referring now to FIGS. 4-9, a row unit arm assembly 150 is disclosed that comprises row unit arms 112, 114 and shaped support 152. Shape support 152 couples row unit arms 112, 114 together. Row unit arms 112, 114 are fixed to shaped support 152 and extend forward therefrom. Shaped support 152 holds row unit arms 112, 114 in a predetermined fixed relationship. Shaped support 152 also includes hinge support tabs 154, 156 that extend from either side of shaped support 152. Hinge support tabs 154, 156 provide a planar mounting surface to which hinges that support points 104 and covers 106 can be attached. Hinge support tabs 154, 156 are formed of the same sheet of metal that shaped support 152 is formed.

Shaped support 152 is generally in the form of an inverted U. it has a generally planar top surface portion 158 that extends across and is welded to the upper surfaces of row unit arms 112, 114. This feature alone, however, does not provide sufficient strength to hold the two row unit arms 112, 114 in predetermined orientation with respect to each other. In practice row unit arms joined by a single planar top surface portion can be relatively easily bent or damaged during operation in the field. Generally planar top portion 158, alone, does not provide sufficient strength to the row unit arms 112, 114 and can permit them to be bent or torn apart under extreme operating conditions.

For this reason, shaped support 152 also comprises two generally vertical side portions 160 that are bent from the same sheet metal stock that forms top portion 158. These vertical side portions form the leg portions of the inverted U. The two side portions 160 are bent to extend downward along the vertical side walls of arms 112, 114. This arrangement provides a double layer thickness to the top surface and to the side surfaces of row unit arms 112, 114. The shaped support is laminated to the top surface and outer side surfaces of row unit arms 112, 114 by weldments that permanently fix the shaped support and the row unit arms together.

Figure 5:
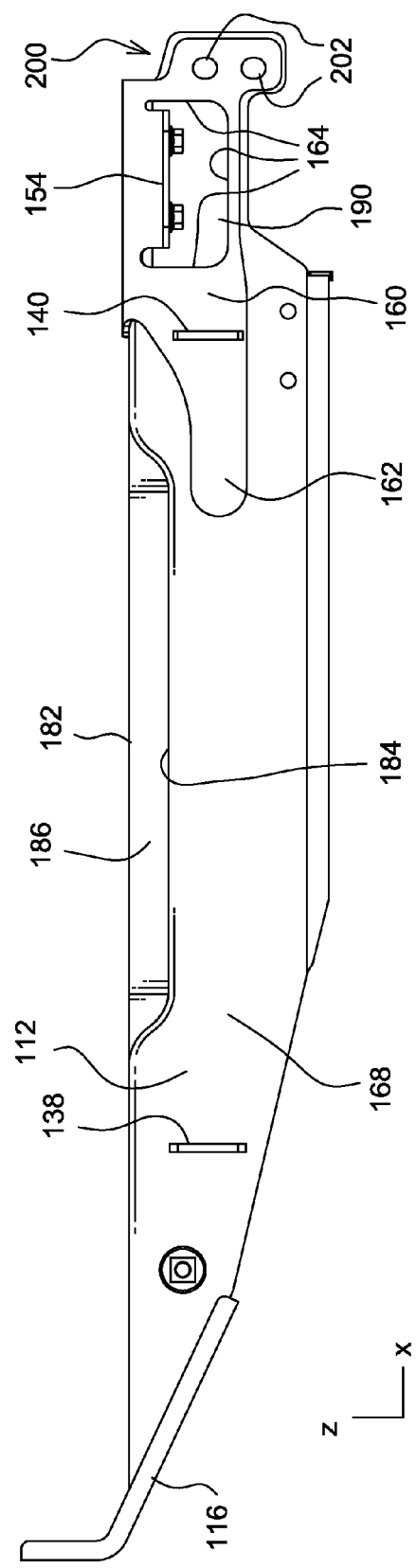
FIG. 5 is a left side view of the row unit arm assembly of FIGS. 3-4.
Figure 6:
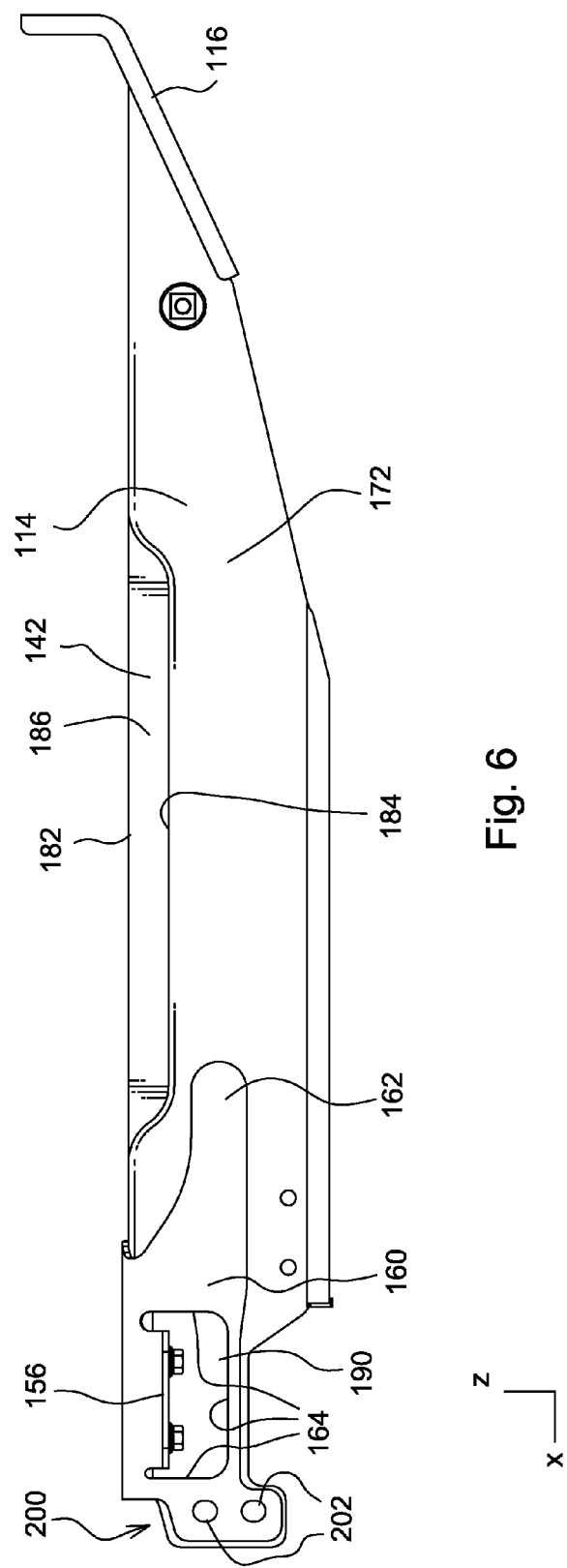
FIG. 6 is a right side view of the row unit arm assembly of FIGS. 3-5.
Figure 9:
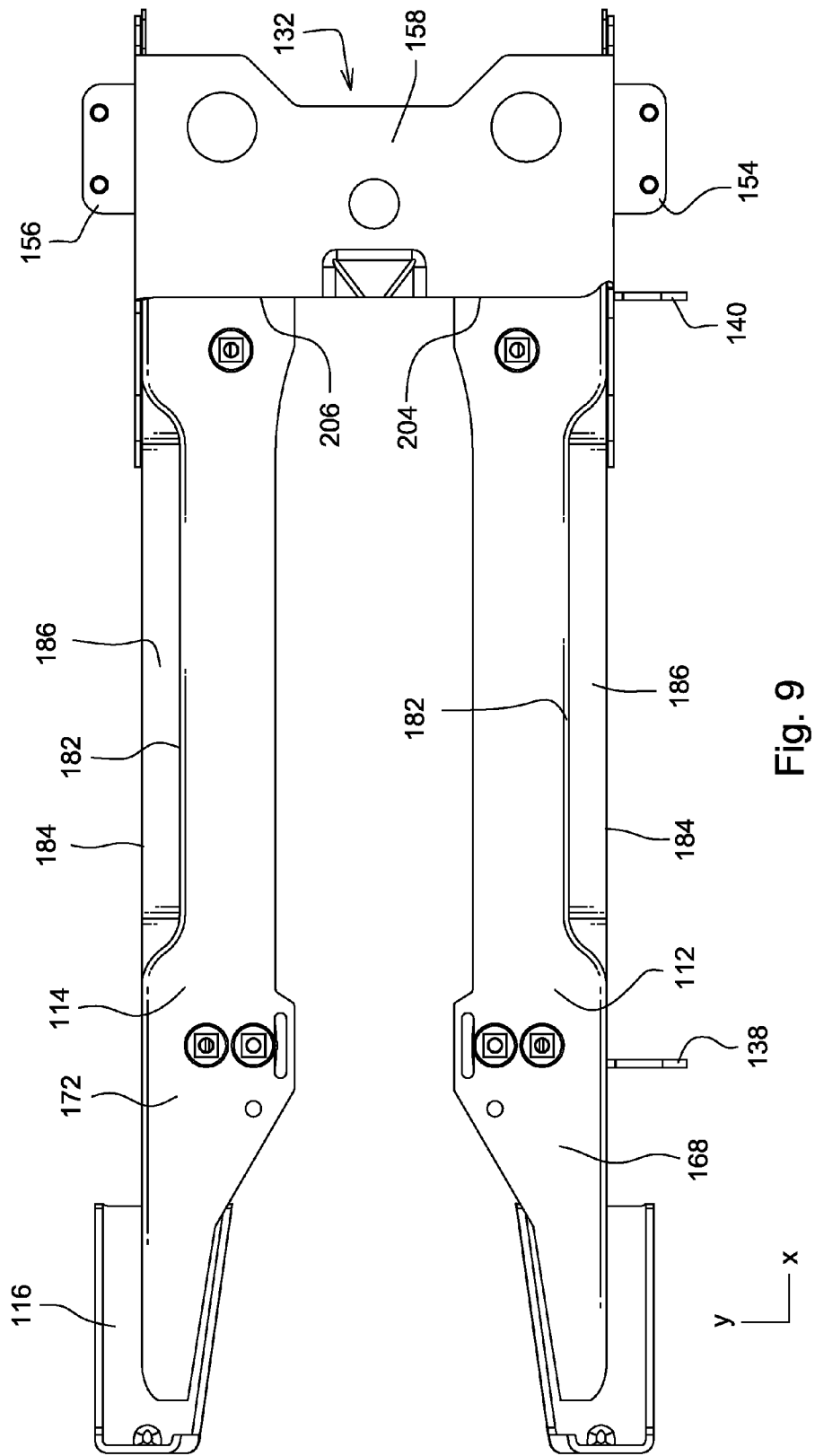
FIG. 9 is a plan view of the row unit arm assembly of FIGS. 3-8.

This inverted U-shaped arrangement provides a double layer laminated thickness of material at mounting brackets 200. Mounting brackets 200 extend her word from the rear of the row unit arm assembly and include apertures 202 that receive threaded fasteners. The fasteners (not shown) are threaded into the gearbox. In this manner, the rear of the row unit arm assembly is fixed to the gearbox. FIGS. 5, 6, and 9 best show the double layer laminated construction of mounting brackets 200 in which the added thickness of side portions 160 generally double the thickness of mounting brackets 200, thereby providing a stronger connection between the row unit arms in the gearbox at a point of particularly high stress.

Side portions 160 have a forwardly extending portion 162 which is formed integral with the top portion 158 and the side portions 160 that extend forward along the vertical side walls of row unit arms 112, 114 to a point forward of top portion 158.

Forwardly extending portions 162 are rounded at their forward in his and our welded to arms 112, 114 along their outer edges. Forwardly extending portions 162 distribute any load applied to arms 112, or 114 along the greater length of arms 112, 114, and reduce the tendency of the arms to bend in the welds attaching top portion 162 tear away from the upper surface of the arms. Hinge support tabs 154, 156 are formed from side portions 160. Side portions 160 are stamped in metal forming dies to form hinge support tabs on 54, 156. These tabs are then bent upwards to form hinge support tabs 154, 156. When hinge support tabs 154, 156 are cut from side portions 160, cut edges 164 are formed in side portions 160. When hinge support tabs 154, 156 are bent upwards, away from side portions 160, the spaces previously occupied by hinge support tabs 154, 156 now form internal closed apertures 190 in side portions 160. Cut edges 164 define the borders of internal closed apertures 190. Cut edges 164 are then welded to the underlying row unit arm. In the case of row unit arm 112, cut edges 164 are welded to elongate member 168, which forms the top wall and generally vertical outer wall of row unit arm 112. In the case of row unit arm 114, cut edges 164 are welded to 172, which forms the top wall and generally vertical outer wall of row unit arm 114.

Figure 7:
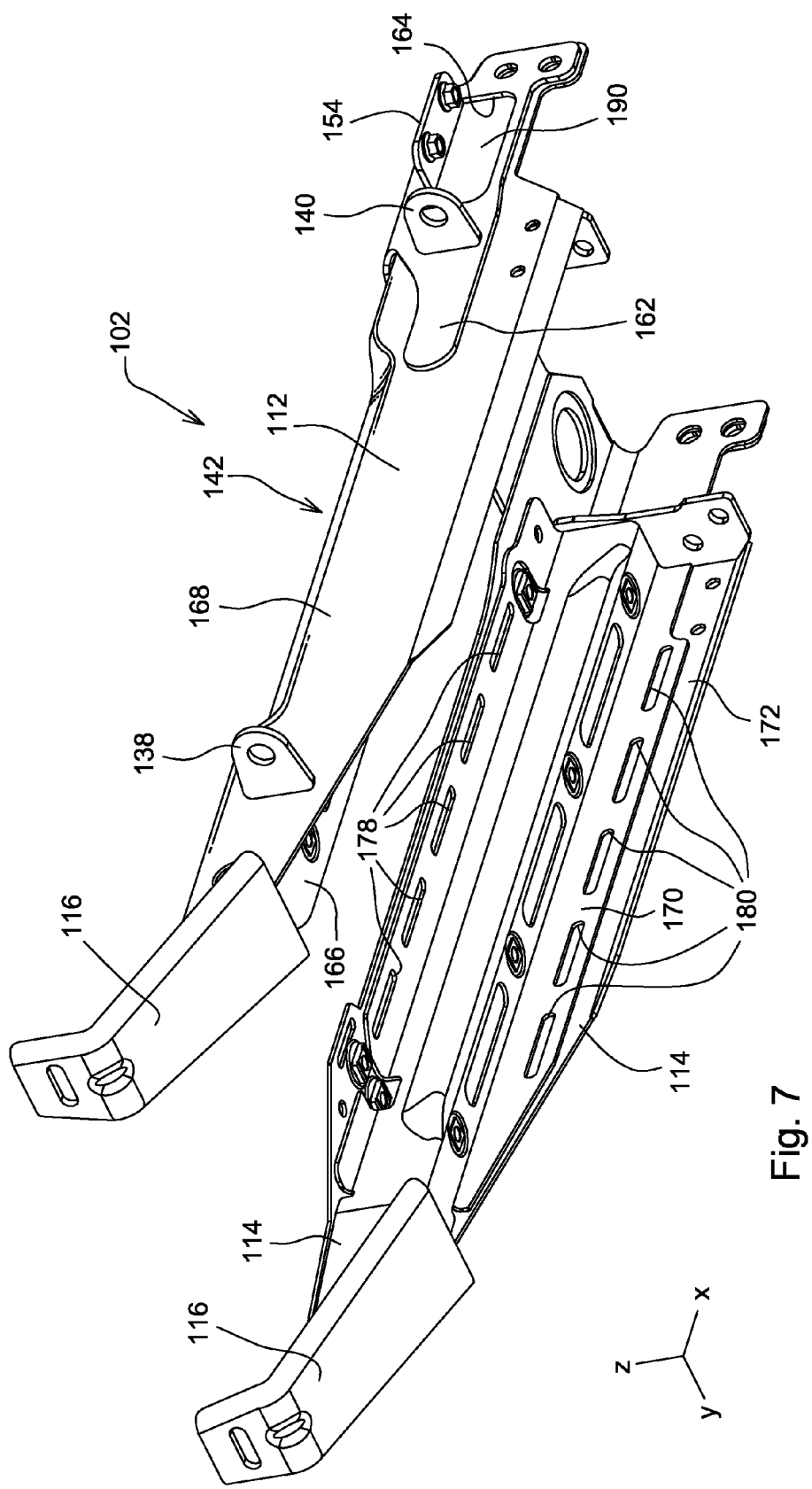
FIG. 7 is a left side bottom perspective view of the row unit arm assembly of FIGS. 3-6.
Figure 8:
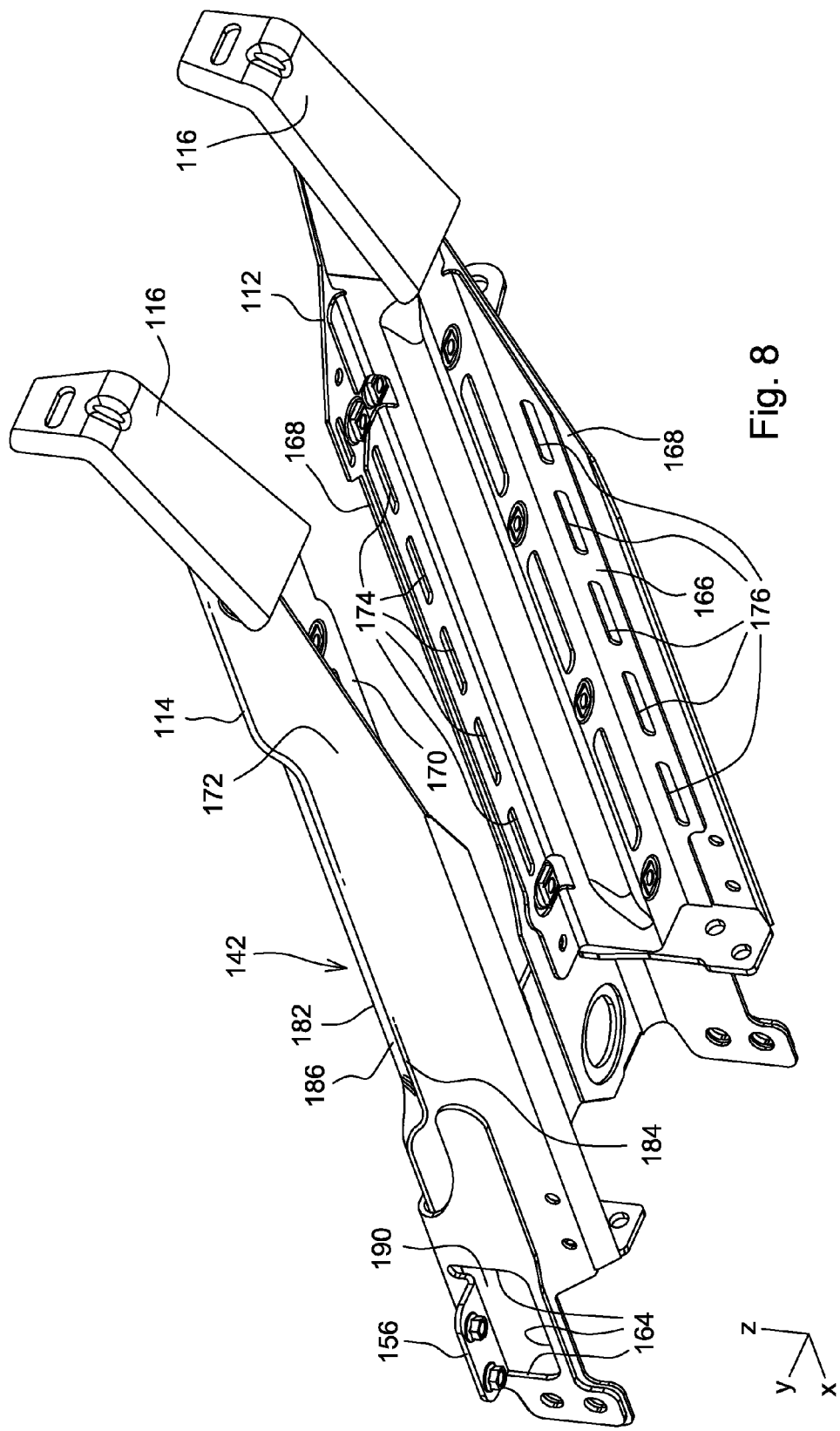
FIG. 8 is the right side bottom perspective view of the row unit arm assembly of FIGS. 3-7

Referring to FIGS. 7-8 in particular, row unit arms 112 114 are generally in the form of a box beam made by welding to L-shaped elongate members together to form a hollow and generally rectangular box shape.

A first L-shaped elongate member 166 forms the bottom wall and inner wall of the box beam of row unit arm 112. A second L-shaped elongate member 168 forms the top wall and outer wall of the box beam of row unit arm 112.

A third L-shaped elongate member 170 forms the bottom wall and inner wall of the box beam of row unit arm 114. A fourth L-shaped elongate member 172 forms the top wall and the outer wall of the box beam of row unit arm 114.

Elongate members 166 and 168 are welded together along two rows of apertures, 174, 176 in elongate member 166 to form row unit arm 112. Rows of apertures 174, 176 extend generally parallel to the longitudinal extent of row unit arm 112. Weldments fix the inner edges of apertures 174, 176 to the underlying portions of elongate member 168, thereby forming the box beam structure of the row unit arm 112.

Elongate members 170, 172 are welded together along two rows of apertures 178, 180 in elongate member 170 to form row unit arm 114. Each aperture in rows 178,180, are closed, having a generally oval shape. Rows of apertures 178, 180 extend generally parallel to the longitudinal extent of row unit arm 114. Weldments fix the inner edges of apertures 178, 180 to the underlying portions of elongate member 172 thereby forming the box beam structure of the row unit arm 114.

The rear portion of the row unit arms 112, 114 is arranged such that a double thickness of sheet metal comprises the rear of each row unit arm on the top and on the sides. The shaped support 152 that extends across the top planar surface of the two row unit arms 112, 114 is bent downward to extend along the vertical outer walls of the row unit arms as well. The shaped support 152 is welded to both the top planar surface of the two row unit arms as well as to the vertical outer walls of the row unit arms. In addition, the generally vertically oriented and forwardly extending portions 162 of generally vertical side portions 160 are also welded to the vertical outer walls of the row unit arms.

The shaped support 152 is also welded to the top surfaces of both the row unit arms 112, 114. Referring to FIG. 9, the leading edges 204, 206 of the top surface portion 158 are welded to the underlying top surfaces of row unit arms 112, 114, respectively.

The invention claimed is:

1. A harvester row unit, comprising:
   a first row unit arm having a top surface that is generally horizontal and an outer surface that is generally vertical and facing away from a second row unit arm;
   the second row unit arm having a top surface that is generally horizontal and an outer surface that is generally vertical and facing away from the first row unit arm; and
   a shaped support having horizontal a top surface that is welded to the top surfaces of the first and second row unit arms, having downwardly extending first and second side surfaces that are welded to the outer surfaces of the first and second row unit arms, wherein the first and second side surfaces are welded to the outer surfaces of the first and second row unit arms at apertures in the first and second side surfaces.

2. The harvester row unit of claim 1, wherein each of the first and second row unit arms are bent to provide a crease along an edge defining the intersection of the top surface and outer surface of the first and second row unit arms.

3. The harvester row unit of claim 1, wherein each of the first and second row unit arms have a box beam construction, with a first L-shaped sheet of metal comprising the top and outer surfaces of the first and second row unit arms, and a second L-shaped sheet of metal defining bottom and inner surfaces of the first and second row unit arms, and further wherein the first and second L-shaped sheet of metal are welded together to form a box beam from the top, outer, inner, and bottom surfaces.

4. The harvester row unit of claim 3, wherein the second L-shaped sheet of metal of each of the first and second row unit arms has at least one row of apertures abutting the first L-shaped sheet of metal, wherein the apertures extend along the length of the second L-shaped sheet of metal, and further wherein edges of the apertures are welded to the first L-shaped sheet of metal to form the box beam.

5. The harvester row unit of claim 1, wherein the apertures in the first and second side surfaces are formed by cutting and bending a tab upward from the side surfaces.

6. The harvester row unit of claim 5, wherein the tab is configured to support a hinge.

7. The harvester row unit of claim 1, wherein the first and second side surfaces of the shaped support further comprise forwardly extending portions that extend forward from the top surface of the shaped support.

8. The harvester row unit of claim 7, wherein the forwardly extending portions are welded to the first and second row unit arms.

9. The harvester row unit of claim 1, wherein the shaped support wraps around and is welded to the top and outer surfaces of the first and second row unit arms to provide at least a double layer construction of sheet metal.

10. The harvester row unit of claim 1, wherein a portion of the first and second side surfaces laminate a row unit gearbox mount to provide additional mount thickness.

* * * * *